United States Patent
Salem et al.

(10) Patent No.: US 7,306,367 B2
(45) Date of Patent: Dec. 11, 2007

(54) EMISSIVITY-INDEPENDENT SILICON SURFACE TEMPERATURE MEASUREMENT

(75) Inventors: Leslie Salem, Haifa (IL); Eitan Zeiler, Haifa (IL); Omri Govrin, Misgav (IL)

(73) Assignee: Electro-Optics Research & Development Ltd., Haifa (IL)

( * ) Notice: Subject to any disclaimer, the term of this patent is extended or adjusted under 35 U.S.C. 154(b) by 618 days.

(21) Appl. No.: 10/052,351

(22) Filed: Jan. 23, 2002

(65) Prior Publication Data

US 2007/0056940 A1    Mar. 15, 2007

Related U.S. Application Data

(60) Provisional application No. 60/263,522, filed on Jan. 24, 2001.

(51) Int. Cl.
*G01K 11/00* (2006.01)

(52) U.S. Cl. ............................ 374/161; 374/2; 374/130; 374/131

(58) Field of Classification Search ............... 374/161, 374/2, 130–131, 137; 356/43, 369; 250/388.1; 702/134–135
See application file for complete search history.

(56) References Cited

U.S. PATENT DOCUMENTS

| | | | |
|---|---|---|---|
| 4,659,234 A * | 4/1987 | Brouwer et al. ............ 374/121 |
| 5,011,295 A * | 4/1991 | Krishnan et al. ............ 374/126 |
| 5,313,044 A * | 5/1994 | Massoud et al. ......... 219/121.85 |
| 5,660,472 A * | 8/1997 | Peuse et al. ................ 374/128 |
| 6,174,081 B1 * | 1/2001 | Holm .......................... 374/161 |
| 6,268,916 B1 * | 7/2001 | Lee et al. .................... 356/369 |

* cited by examiner

*Primary Examiner*—Gail Verbitsky
*Assistant Examiner*—Megann E Vaughn
(74) *Attorney, Agent, or Firm*—Mark M. Friedman

(57) ABSTRACT

A method and system for measuring remotely the surface temperature of a silicon wafer and layers, without the need to know the surface emissivity. The surface temperature is measured in-situ and in real-time during a high-temperature process, in a vacuum system, by using the linear polarization property of radiation. A blackbody source is heated to various, known temperatures, and provides radiation that impinges on the silicon surface and is reflected from it together with a self-emitted component. This combined reflected radiation is polarized and filtered to an appropriate wavelength, and observed with an imaging camera. Pairs of orthogonally polarized images of the surface are obtained for a set silicon surface temperature and for each blackbody temperature. The pairs of images are analyzed, pixel by pixel, to obtain a null polar level indicative of the surface temperature. The system is provided with means for rapid variation of the blackbody temperature, thus allowing measurement of rapidly changing silicon surface temperatures.

7 Claims, 3 Drawing Sheets

EMISSIVITY-INDEPENDENT SILICON SURFACE TEMPERATURE MEASUREMENT

CROSS REFERENCE TO RELATED APPLICATIONS

The present application claims the benefit of priority from U.S. Provisional Application No. 60/263,522 filed Jan. 24, 2001, the contents of which are incorporated herein by reference.

FIELD AND BACKGROUND OF THE INVENTION

The determination of true surface temperature of Silicon (Si) during the various processes encountered in the fabrication of a microelectronic chip is an important parameter that determines the quality of the manufactured product. One of the methods used in determining the surface temperature is based on remotely sensing the radiation from the silicon surface. If the surface emissivity is known, one can deduce the surface temperature from the remote measurement. However the surface emissivity is usually not known accurately enough, and moreover it is a function of temperature and the surface treatment the silicon is subjected to.

The total radiation from a surface is composed of a self-emitted part and a reflected part. At high temperatures the self-emitted radiation from a Si surface at a given viewing angle has a certain degree of linear polarization as determined by its complex refractive index. If in addition a known source of radiation is reflected from the surface, then this reflected component has a degree of polarization (DOP) that is in opposition to that of the emitted component. As shown previously in an article by one of the present inventors, Balfour L. S. (Leslie Salem), "Infrared polarization thermometry using an imaging radiometer", QIRT 94, Eurotherm Series 42-EETI ed., Paris 1995 pp. 103-105, one can obtain a null value for the DOP when the sources of the reflected and emitted components are at the same temperature. This forms the basis for an accurate surface temperature determination, without the need to know the surface emissivity.

The method described in the QIRT 94 reference above measured a painted copper surface in ordinary atmospheric surroundings, which affect the heat loss processes occuring on the surface. In contrast, silicon-processing systems are typically vacuum systems, in which both the access to the measured surface and the heat transfer between the Si surface and the surroundings are more complicated. In the QIRT94 reference, no consideration was given to the rate of change of temperatures, neither of the source nor of the examined surface. All measurements were carried out under steady state conditions, which are irrelevant to measurements of silicon surfaces in which there are rapid variations in the surface temperature, e.g. in Rapid Thermal Processing (RTP). RTP is characterized by two different aspects: fast heating rates (up to a few hundred degrees Celsius per second) and short holding times at a constant temperature (down to 1 second per process). Consequently, there are no known instances in which the method described in the QIRT reference was applied to temperature measurements of silicon surfaces, probably due to the inherent difficulties and complications involved.

The use of reflected linearly polarized light for real time, Si surface temperature detection is known, as disclosed for example in U.S. Pat. No. 5,313,044 to Massoud et al. However, the method disclosed therein suffers from a number of disdvantages, including a requirement for a-priori knowledge of the temperature dependence of the Si wafer refractive index. This temperature dependence is derived under steady state conditions, in which the silicon wafer is at equilibrium with its surroundings at elevated temperatures. In typical silicon thermal processing conditions, and in particular under RTP, the wafer is far from thermodynamic equilibrium. It is safe to assume that under such conditions the refractive index versus temperature curve is different from that in steady state. This can lead to major errors in wafer temperature estimation.

Hence, a remote temperature measurement system and method for silicon thermal processing, particularly RTP, that requires no a-priori knowledge of parameters such as described above, and is independent of emissivity, is highly desirable.

SUMMARY OF THE INVENTION

The present invention is of a method and system to measure remotely the surface temperature of a silicon wafer, without the need to know the surface emissivity. In particular, the present invention advantageously provides a method and system to measure the surface temperature of silicon wafers and layers deposited thereon in-situ and in real-time during a high-temperature process. In a preferred embodiment, the method and system disclosed herein are particularly advantageous for use in a RTP process performed in a vacuum system, in the range 450-1100 C.

According to the present invention there is provided a method for remotely measuring the surface temperature of a silicon wafer heated to a set temperature, comprising: providing a blackbody source configured to be heated to a required blackbody temperature, varying the blackbody temperature in discrete steps through a given temperature interval, for each blackbody temperature obtaining two orthogonally polarized images of an area on the silicon wafer using radiation of an appropriate wavelength reflected from the silicon wafer, and obtaining a null polar level from the two orthogonally polarized images, the null polar level being indicative of the silicon wafer surface temperature, whereby the surface temperature is determined without the need to know the surface emissivity.

According to features in the method of the present invention, the step of varying the blackbody temperature in discrete steps through a given temperature interval includes the substep of varying the blackbody temperature at a rapid rate typical of RTP processes.

According to additional features in the method of the present invention, the substep of varying the blackbody temperature at a rapid rate typical of RTP processes further includes providing a first circularly variable neutral density filter inserted between the blackbody source and the silicon wafer, holding the blackbody source at a constant temperature, and orienting the first circularly variable neutral density filter in different angular orientations in order to attenuate the radiation of the blackbody source by known amounts.

According to additional features in the method of the present invention, the step of providing a blackbody source configured to be heated to a required blackbody temperature includes providing a variable intensity diode laser source emitting laser radiation at an appropriate wavelength, and a second circularly variable neutral density filter used to modulate the laser radiation.

According to the present invention there is provided a system for the remote measurement of the surface temperature of a silicon wafer heated to a set temperature, comprising: a blackbody source configured to be heated at a required rate to a required blackbody temperature, the blackbody source emitting blackbody radiation that impinges upon the silicon wafer at a given impingement angle, imaging means for receiving radiation reflected from the silicon wafer surface at an angle identical with the impingement angle, a linear polarizer inserted in an optical path between the imaging means and the silicon wafer, the polarizer polarizing the reflected radiation and facilitating the formation of pairs of orthogonally polarized images in the imaging means, a narrow band filter centered at an appropriate wavelength inserted in the optical path between the imaging means and the silicon wafer, and means for calculating polar levels based on the pairs of orthogonally polarized images and for obtaining a null level of the polar levels, whereby the silicon surface temperature is obtained from the null level without a need to measure the silicon surface emissivity.

According to features in the system of the present invention, the blackbody source further includes a first circularly variable neutral density filter inserted between the blackbody source and the silicon wafer.

According to additional features in the system of the present invention, the blackbody source includes a variable intensity diode laser source emitting laser radiation at an appropriate wavelength, and a second circularly variable neutral density filter used to modulate the laser radiation.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and system to measure remotely the surface temperature of a silicon wafer, without the need to know the surface emissivity or any other a-priori surface property. "Substrate" and "wafer" are used herein interchangeably, and are meant to include layers or thin films deposited or grown by commonly used techniques on the Si wafer. Specifically, the present invention can be used to measure the surface temperature of silicon wafers and layers deposited thereon in-situ and in real-time during a high-temperature process, for example an RTP process, in a vacuum system, in the range 450-1100 C. The proposed method is based on the linear polarization property of the radiation emanating from the surface. The principles and operation of an emissivity independent method and system to measure remotely the surface temperature of a silicon wafer according to the present invention may be better understood with reference to the drawings and the accompanying description.

Figure 1:
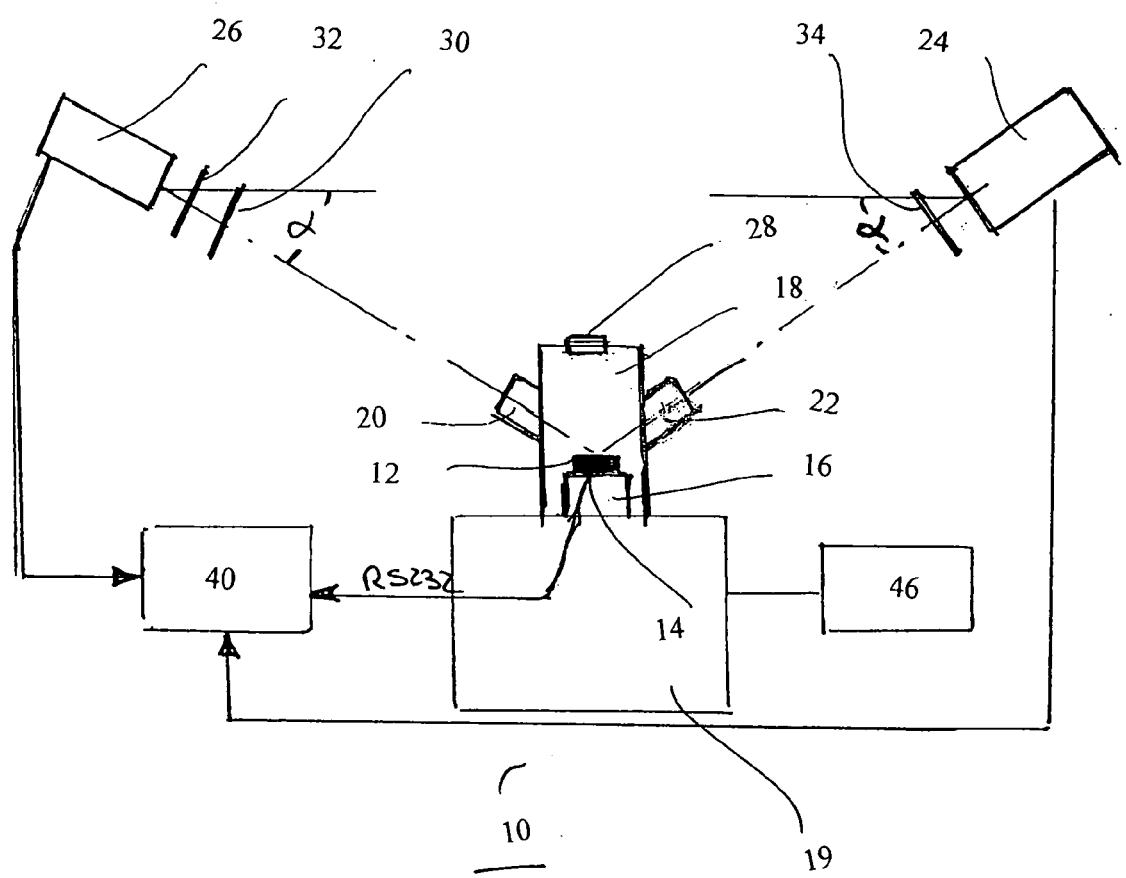
FIG. 1 illustrates an exemplary experimental setup to measure the surface temperature of a Silicon wafer using the method of the present invention.

Referring now to the drawings, FIG. 1 illustrates an exemplary experimental setup 10 to measure the surface temperature of a silicon substrate or wafer. Silicon wafer 12 has a number of thermocouples (not shown) bonded to its bottom 14 that is in physical contact with a heating stage 16 inside a vacuum chamber 18 mounted atop a vacuum system 19. The number of thermocouples can vary according to wafer size and other parameters. For example, silicon wafers with 5 thermocouples are available commercially ("Process Probe 1530" from SensArray Corp., 3410 Garret Drive, Santa Clara, Calif. 95054-2803). Vacuum chamber 18 has two quartz windows 20 and 22 at its sides. One window, e.g. window 20 is oriented such that the silicon surface can be illuminated by blackbody radiation from an external blackbody source 24. Although discussing hereafter blackbody sources, "source" as used in the specification may encompass other entities. For example, a variable intensity diode laser source emitting a laser radiation at an appropriate wavelength may be used to imitate source temperature changes, and replace a true blackbody. For such a device, the radiance could be changed rapidly by passing it through a circularly variable neutral density filter of the type described below. Since the laser is a quasi-monochromatic source, the radiance variations at the laser wavelength have to be correlated with corresponding blackbody temperature changes.

Through the other window (e.g. 22) the specularly reflected radiation of external blackbody source 24 along with the self emitted radiation from the silicon surface is collected by an imaging camera system 26 sensitive to radiation in the appropriate spectral region. Camera 26 can be for example a near infrared Xybion camera from (XYBION Corporation, Cedar Knolls, N.J.) which is an uncooled silicon CCD camera. A third window 28 above the silicon surface allows one to view the silicon surface from above.

A linear polarizer 30 is situated in front of a camera lens and allows one to take images of the silicon surface at two orthogonal orientations of the polarizer. Preferably, polarizer 30 is compatible for work in the thermal infrared region of the spectrum. A narrow band filter 32 centered at an appropriate wavelength is inserted in the optical path between the polarizer and the camera. The wavelength is chosen so as the silicon is opaque and reflecting the source radiation. Preferably, the wavelength is either 1 µm or 16 µm, and most preferably 1 µm.

For rapid temperature measurement changes, a second, circularly variable neutral density (CVND) filter 34 is inserted in the beam path between the source and the silicon surface. CVND filters are known and manufactured by various manufacturers, for example Reynard Corporation, 1020 Calle Sombra, San Clemente Calif. 92673-6277. Filter 34 attenuates the source radiation by known amounts at each of its angular orientations, enabling to imitate fast temperature changes in the blackbody. Fast changes are defined as changes required for the blackbody to follow the rate of change in the silicon wafer temperature. In RTP, such changes can range from 0 degrees Celsius/sec to hundreds of degrees Celsius/sec. "Changes" are defined also the process of short holding set temperatures (on the order of 1 sec and up) that are then changed to another temperature. Such changes in the blackbody itself are practically impossible to obtain due to the blackbody thermal inertia involved. In such a case, the blackbody source will be maintained at a constant high temperature (say 1100 C). The rapid "imitated" temperature changes facilitated by filter 34 are a key element in the application of the method of the present invention to Si temperature measurements during RTP, measurements which are impossible to obtain with the method described in the QIRT 94 reference. It is emphasized that the method is of the present invention is equally applicable in cases where the temperature changes are very slow or non-existent (e.g. a constant temperature process). In these cases, filter 34 may be removed.

The DOP (i.e. the normalized polar level) of the collected beam is determined from this polarized pair of images. The DOP varies with the difference between the temperatures of the silicon surface and that of the blackbody source reflected from the silicon surface. When the DOP acquires a null value, the temperature of the silicon surface equals that of the blackbody source reflected from the silicon surface. The sign of the DOP indicates whether the silicon temperature is above or below that of the blackbody source. This can be utilized for automatically controlling the furnace heater in order to stabilize the silicon surface at a required temperature.

In a typical measurement sequence, the silicon wafer is placed over the heating stage with its bare (thermocouple free) surface facing upwards. The thermocouple leads are connected to a temperature measurement data logger unit (not shown), which is connected through an RS 232 interface to a computer 40. The vacuum chamber is pumped out. Next, the blackbody source and the imaging camera are aligned such that the blackbody source after reflection from the silicon surface is seen in the camera image. The blackbody source and the camera are preferably tilted at an angle α of between 27 and 37 degrees, most preferably at about 32° with respect to the horizontal. This is the angle at which the blackbody radiation impinges on the silicon surface and is reflected from it.

The blackbody source is now heated to, and held steady at, a high enough temperature at which the source radiation, reflected off the silicon wafer surface, is seen at a wavelength of 1 μm or 16 μm. The vacuum chamber is pumped down to a low pressure, and the silicon wafer is heated to a high enough temperature so that a measurable self-emitted component at a wavelength of 1 μm or 16 μm can be measured by the camera system. The silicon temperature is maintained at a steady temperature level by a temperature control unit 46. In the example discussed below, the silicon surface was maintained at 530 C.

The blackbody source is now heated and held steady at a temperature level slightly below the wafer temperature. The polarizer is rotated, and the orientation of the polarizer is determined where the source reflected image is reduced to a minimum intensity level. In RTP measurements, circularly variable neutral density filter 34 is used to attenuate the source radiation by being rotated to known amounts of angular orientations, these amounts correlated with known "imitation" temperatures of the blackbody. Such correlations may be performed separately, and listed by way of look-up tables or similar devices. Once the correlations are known, filter 34 may be rotated to any desired angular orientation (i.e. desired blackbody temperature) without further calibration. The rate of change required in the blackbody temperature depends on the process: for regular processes, the rate may be small (down to 0 C./sec—i.e. no change), while for some RTP processes the rate may go to typically 100-200 C./sec.

A first image of the silicon surface is taken at this orientation of the polarizer. The polarizer orientation is next rotated by 90 degrees, and a second image of the silicon surface is taken. These two orthogonally polarized images are then analyzed to determine the difference, at each pixel, in gray levels, i.e. obtain the "polar levels" over the region illuminated by the source. It is only over this region that the surface temperature of the wafer is determined.

The "reflected" beam that enters the imaging camera consists of two inseparable parts that are relevant to the present method: one part consists of the radiation reflected from the blackbody source, and the other part consists of the self-emitted radiation from the silicon surface. The first image is taken with the polarizer oriented say to position "1", and the second image is taken with the polarizer oriented at position 1+90°. The gray level difference corresponds to the difference obtained from the same region of interest in the above image pair. The region of interest is chosen to be the area illuminated by the blackbody source. In the example below, the area was roughly defined by a circle with a diameter of about 2 cm. The order of the image pairs has to be maintained while determining the difference values. That is, if the order starts with the difference from the first image pair as (Position 1−Position 1+90°) then this order should be maintained for all the other image pairs. The various image pairs correspond to those taken for different blackbody source temperatures for a given silicon surface temperature.

EXAMPLE

A test experiment was carried out using the apparatus of FIG. 1. Orthogonally polarized pairs of images were obtained using the camera, the 1 μm filter, and the polarizer. The silicon surface was held at a set temperature of 530° C., as indicated by the furnace controller. The readings of the five attached thermocouples were recorded by a CR10 data-logging unit with PC208 software. The blackbody source temperature was varied from 400° C. to 600° C. in steps of 10° C. when far away from the set temperature of the silicon surface, and in steps of 5° C. when close to the set temperature.

Figure 2:
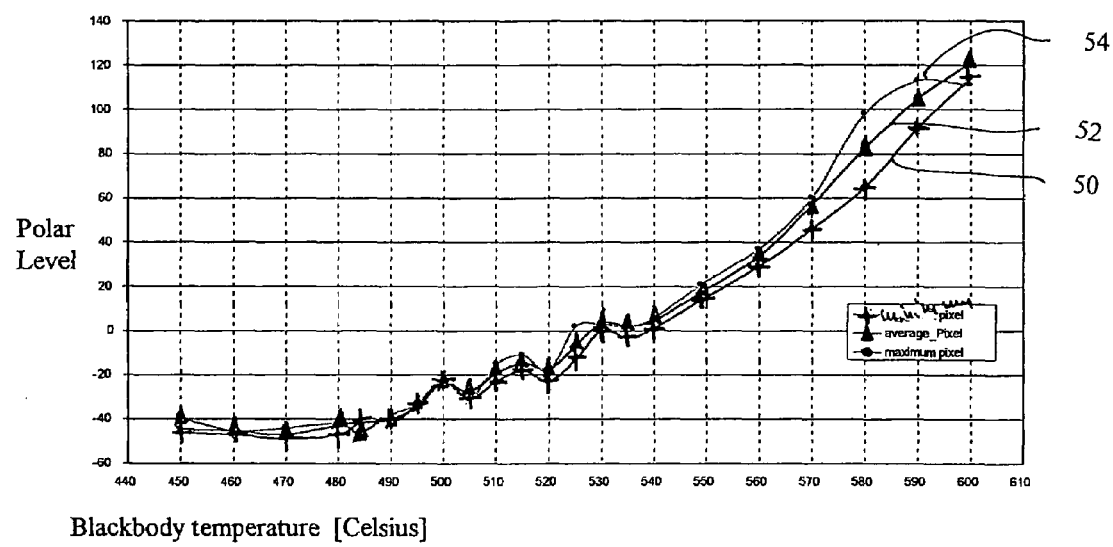
FIG. 2 shows an experimental plot of gray level differences (polar levels) obtained from the pair of polarized images vs. a blackbody temperature
Figure 3:
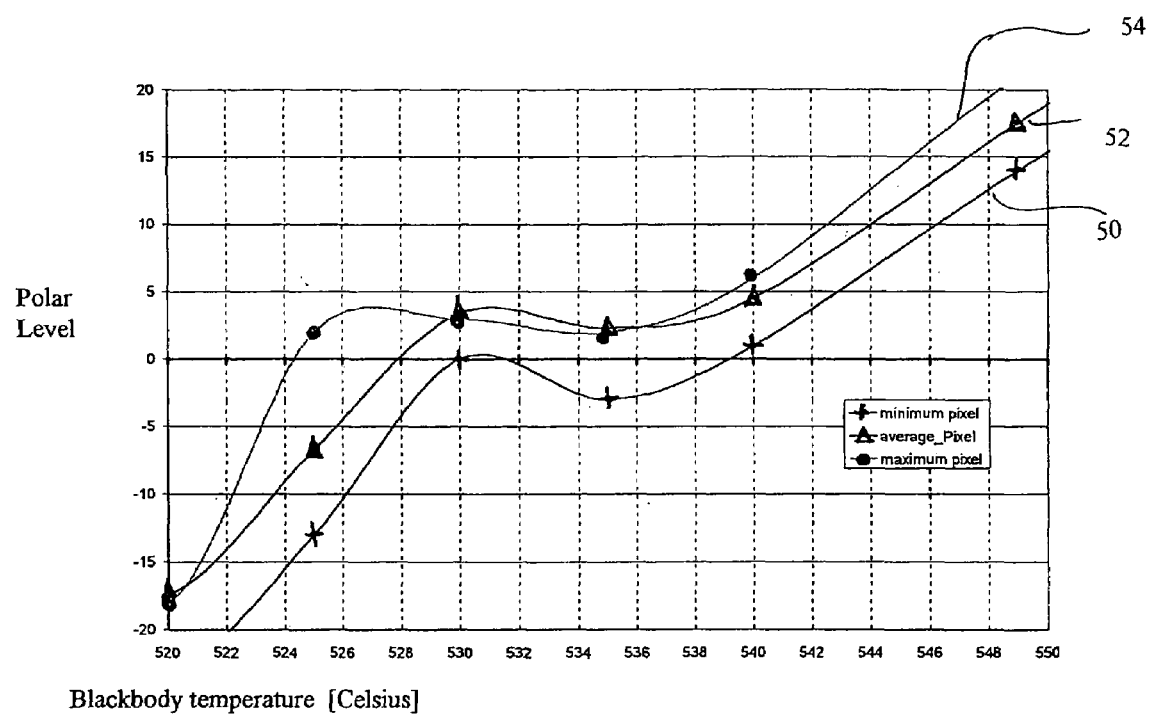
FIG. 3 shows a zoom-in near the zero gray level crossing region.

At each temperature of the blackbody, a pair of polarized images was taken for orthogonal orientations of the polarizer. From these images the pixel-by-pixel gray level differences over the silicon region illuminated by the blackbody source was obtained, using a standard image processing software. A plot of these gray level differences (polar levels) versus the blackbody temperature is shown in FIG. 2. FIG. 3 shows a zoom-in near the zero polar level crossing region. Both figures show three graphs, a graph 50 for a minimum pixel, a graph 52 for an average pixel and a graph 54 for a maximum pixel difference. The region over which the values are zero vary over about 10° C. in the neighborhood of 530° C. From these graphs one sees that the polar level is positive when the blackbody source is at a higher temperature than the silicon surface, and negative when when the blackbody source is at a lower temperature than the silicon surface. In other words, graphs of the type shown in FIGS. 2 and 3 show that the difference values can go from negative to positive values. The temperature of the blackbody source at the zero crossing (polar level=0) is then the true surface temperature of the wafer.

The silicon temperature was determined by the thermocouple measurements and it was noted that there was a 10° C. fluctuation around the set point caused by the furnace heater itself. Thus one can say that the zero point crossing determines the surface temperature to a high level of accuracy, and all this without any knowledge of the surface emissivity of the silicon substrate. The temperature range in which the method and apparatus disclosed herein can provide an accurate silicon surface temperature ranges between about 400 and about 1100 C.

In summary, the remote temperature measurement system and the method used to measure silicon surface temperature during thermal processing disclosed herein differs in significant ways, and presents significant advantages over related prior art systems and methods, including:

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A method for remotely measuring the surface temperature of a silicon wafer heated to a set temperature, comprising:
    a. providing a blackbody source configured to be heated to a required blackbody temperature,
    b. varying said blackbody temperature in discrete steps through a given temperature interval,
    c. for each said blackbody temperature, obtaining two orthogonally polarized images of an area on the silicon wafer using radiation of an appropriate wavelength reflected from the silicon wafer, and
    d. obtaining a null polar level from said two orthogonally polarized images, said null polar level being indicative of the silicon wafer surface temperature, whereby the surface temperature is determined without the need to know the surface emissivity.

2. The method of claim 1, wherein said step of varying said blackbody temperature in discrete steps through a given temperature interval includes the substep of varying said blackbody temperature at a rapid rate typical of RTP processes.

3. The method of claim 2, wherein said substep of varying said blackbody temperature in discrete steps through a given temperature interval at a rapid rate typical of RTP processes further includes providing a first circularly variable neutral density filter inserted between said blackbody source and the silicon wafer, holding said blackbody source at a constant temperature, and orienting said first circularly variable neutral density filter in different angular orientations in order to attenuate the radiation of said blackbody source by known amounts.

4. The method of claim 1, wherein said step of providing a blackbody source configured to be heated to a required blackbody temperature includes providing a variable intensity diode laser source and a second circularly variable neutral density filter used to modulate said laser radiation.

5. The method of claim 1, wherein said step of obtaining a null polar level from said two orthogonally polarized images further includes setting the silicon surface temperature to a set temperature.

6. The method of claim 1, wherein said appropriate wavelength is centered around 1 μm.

7. The method of claim 1, wherein said appropriate wavelength is centered around 16 μm.

* * * * *